(12) United States Patent
Gheyri (10) Patent No.: US 8,857,425 B2
(45) Date of Patent: Oct. 14, 2014

(54) SOLAR LENS WATER HEATING SYSTEM

(76) Inventor: Cyrous Gheyri, San Jose, CA (US)

( * ) Notice: Subject to any disclaimer, the term of this patent is extended or adjusted under 35 U.S.C. 154(b) by 181 days.

(21) Appl. No.: 13/236,488

(22) Filed: Sep. 19, 2011

(65) Prior Publication Data

US 2012/0037150 A1     Feb. 16, 2012

(51) Int. Cl.
| | | |
|---|---|---|
| F24J 2/04 | (2006.01) | |
| F24J 2/08 | (2006.01) | |
| F24J 2/22 | (2006.01) | |
| F24D 11/00 | (2006.01) | |
| F24D 19/10 | (2006.01) | |
| F24D 3/08 | (2006.01) | |
| F24D 3/14 | (2006.01) | |

(52) U.S. Cl.
CPC .. F24J 2/08 (2013.01); Y02B 10/20 (2013.01); Y02E 10/44 (2013.01); F24D 2220/006 (2013.01); F24J 2/22 (2013.01); F24D 19/1042 (2013.01); F24D 11/003 (2013.01); F24D 3/08 (2013.01); F24D 3/14 (2013.01); F24D 2200/14 (2013.01)
USPC ........... 126/641; 126/623; 126/634; 126/640; 126/642; 126/643; 126/646; 126/658; 126/698; 126/699; 126/704

(58) Field of Classification Search
CPC .............. F24D 11/003; F24J 2/06; F24J 2/08; F24J 2/26; F24J 2/085; F24J 2/0472; Y02B 10/20; Y02E 10/40; Y02E 10/43
USPC ......... 126/640, 646, 658, 698–700, 704, 623, 126/634, 641–643
See application file for complete search history.

(56) References Cited

U.S. PATENT DOCUMENTS

| | | | | | |
|---|---|---|---|---|---|
| 2,553,302 | A | * | 5/1951 | Cornwall | 237/56 |
| 4,010,080 | A | * | 3/1977 | Tsay et al. | 202/83 |
| 4,075,063 | A | * | 2/1978 | Tsay et al. | 202/234 |
| 4,085,731 | A | * | 4/1978 | Weir | 126/634 |
| 4,188,941 | A | * | 2/1980 | Hopkins | 126/646 |
| 4,221,466 | A | * | 9/1980 | Neumann | 359/509 |
| 4,279,244 | A | * | 7/1981 | McAlister | 126/621 |
| 4,291,672 | A | * | 9/1981 | Ricks | 126/565 |
| 4,305,383 | A | * | 12/1981 | Bloxsom | 126/643 |
| 4,461,278 | A | * | 7/1984 | Mori | 126/700 |
| 4,469,086 | A | * | 9/1984 | Ivorra | 126/400 |
| 4,474,209 | A | * | 10/1984 | Akhtarekhavari | 137/559 |

(Continued)

FOREIGN PATENT DOCUMENTS

FR     2299604  A  *  10/1976

*Primary Examiner* — Jorge Pereiro
(74) *Attorney, Agent, or Firm* — Gordon Rees Scully Mansukhani LLP (57) ABSTRACT

A solar water heating system, including: (a) a solar heating collector, having: (i) an array of convex lenses; (ii) a panel disposed below the array of convex lenses, wherein the array of convex lenses focuses sunlight on the panel to heat areas of the panel; (iii) a fluid chamber disposed below the panel; and (iv) a plurality of members extending from the panel into the fluid chamber to transfer heat from the panel into fluid in the fluid chamber; (b) a fluid reservoir; (c) a fluid inlet line for moving fluid from the fluid reservoir into the fluid inlet of the solar heating collector; (d) fluid outlet line for moving fluid from the fluid chamber of the solar heating collector to the fluid reservoir; and (e) a pump for moving fluid cyclically through the fluid chamber of the solar collector and the fluid reservoir.

17 Claims, 8 Drawing Sheets

(56) References Cited

U.S. PATENT DOCUMENTS

| | | | |
|---|---|---|---|
| 4,509,502 A * | 4/1985 | Youcha | 126/699 |
| 4,771,763 A * | 9/1988 | Wetzel, Jr. | 126/646 |
| 5,119,988 A * | 6/1992 | Fiedrich | 237/8 C |
| 5,143,051 A * | 9/1992 | Bennett | 126/561 |
| 5,292,065 A * | 3/1994 | Fiedrich | 237/69 |
| 5,596,981 A * | 1/1997 | Soucy | 126/704 |
| 5,933,276 A * | 8/1999 | Magee | 359/455 |
| 5,957,378 A * | 9/1999 | Fiedrich | 237/69 |
| 6,047,697 A * | 4/2000 | Best | 126/635 |
| 6,152,377 A * | 11/2000 | Fiedrich | 237/69 |
| 6,870,681 B1 * | 3/2005 | Magee | 359/626 |
| 2010/0186794 A1 * | 7/2010 | Chen et al. | 136/206 |
| 2010/0198414 A1 * | 8/2010 | Kroll et al. | 700/278 |

* cited by examiner

SOLAR LENS WATER HEATING SYSTEM

TECHNICAL FIELD

The present invention relates to solar hot water collectors and to systems for heating buildings.

SUMMARY OF THE INVENTION

In one preferred aspect, the present invention provides a solar heating collector, comprising: (a) an array of convex lenses; (b) a panel disposed below the array of convex lenses to focus sunlight on the panel to heat areas of the panel; (c) a fluid chamber disposed below the panel; and (d) a plurality of members extending down from the panel into the fluid chamber to transfer heat from the panel into fluid in the fluid chamber. Preferably, the panel is made of metal, and the fluid used is water.

In various aspects of the invention, the plurality of members extending down from the panel may be clustered around areas on the panel onto which sunlight is focused. In operation, the convex lenses heat certain regions of the panel, and the heat from these regions is then conducted into the fluid chamber. This heated water is then pumped from the collector into the building. The heated water may be sent either into the hot water heater tank, or it may instead be sent into a plurality of water containers disposed within the walls of a building, or into floor tubing, or into some combination of the above. An advantage of having fluid reservoirs in the building walls is that heated water stored in the water containers can then be used to provide heat to the building during cool nights, thus providing a time-delay effect to the building's cooling.

The present invention also provides an entire solar water heating system, including the solar heating collector described above (mounted onto the top of a building), together with a fluid reservoir (i.e.: a hot water tank or fluid container(s) in the building), and a pump for moving fluid cyclically between the solar collector and the fluid reservoir.

Preferably as well, a control system can also be included for turning the pump on and off. In various aspects, this control system can be activated either by the temperature of the water in the hot water heater, or by the temperature of the air within the building. This is because the present invention can be used either to heat the water stored in the building's hot water tank, or it can be used to provide heated water to warm the walls and/or floors of the building (and thus warm the building's air).

For example, when the temperature in the hot water tank cools to a certain point, then the pump can be turned on. This then pumps cool water from the hot water tank into the solar collector on the roof and returns heated water to the hot water tank. Alternatively, when heated water is stored in fluid reservoirs in the building's walls or floor, the pump can be turned on when the building air temperature falls below a pre-set temperature.

The present invention has numerous advantages. For example, its novel convex lens heating achieves very high temperatures on the panel, which are then conducted into in the water in the collector. In addition, the heated water produced in the collector can either be used: (i) to provide hot water for building occupants, or (ii) to warm the air within the building, or (iii) both. When the present invention is used to heat building air, the added advantage of the heated water warming the building through cool nights is also seen.

DETAILED DESCRIPTION OF THE DRAWINGS

The present invention provides both an individual solar water heating collector, and an overall building hot water heating system incorporating the collector.

Figure 1:
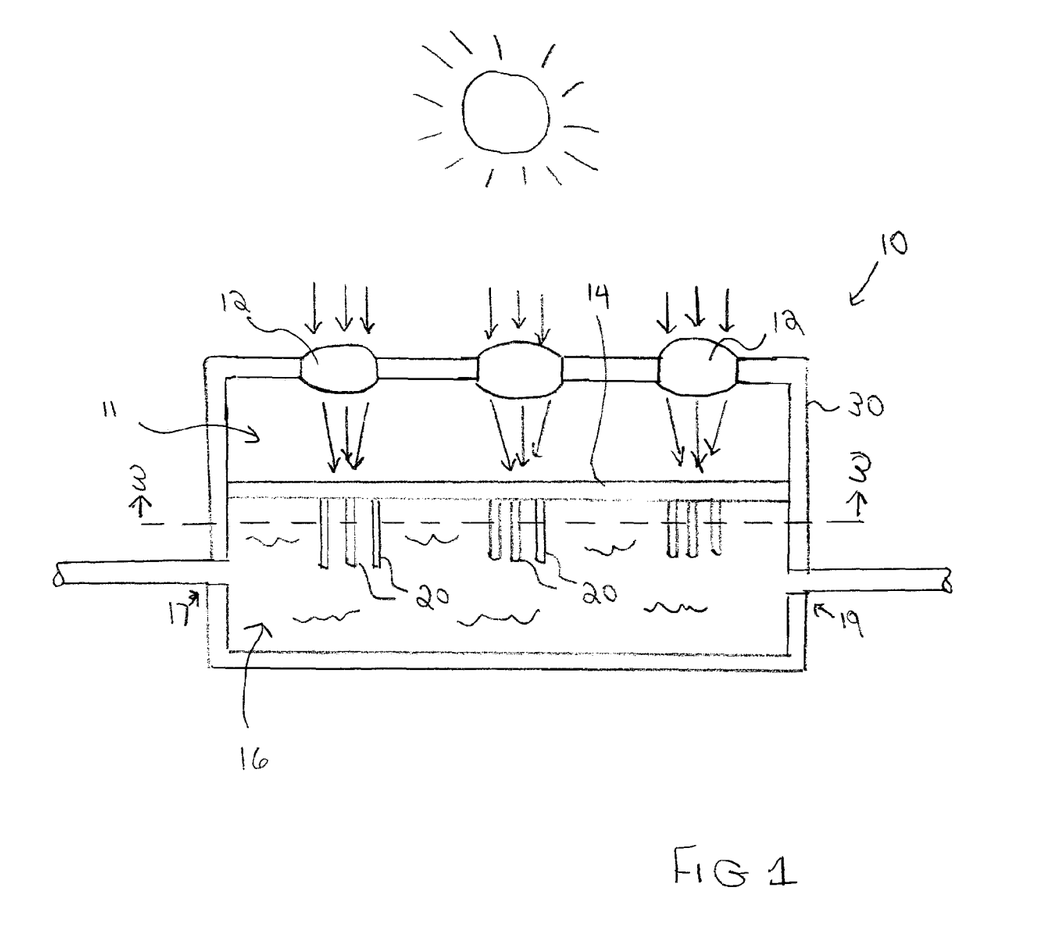
FIG. 1 is a sectional side elevation view of the present solar collector.
Figure 2:
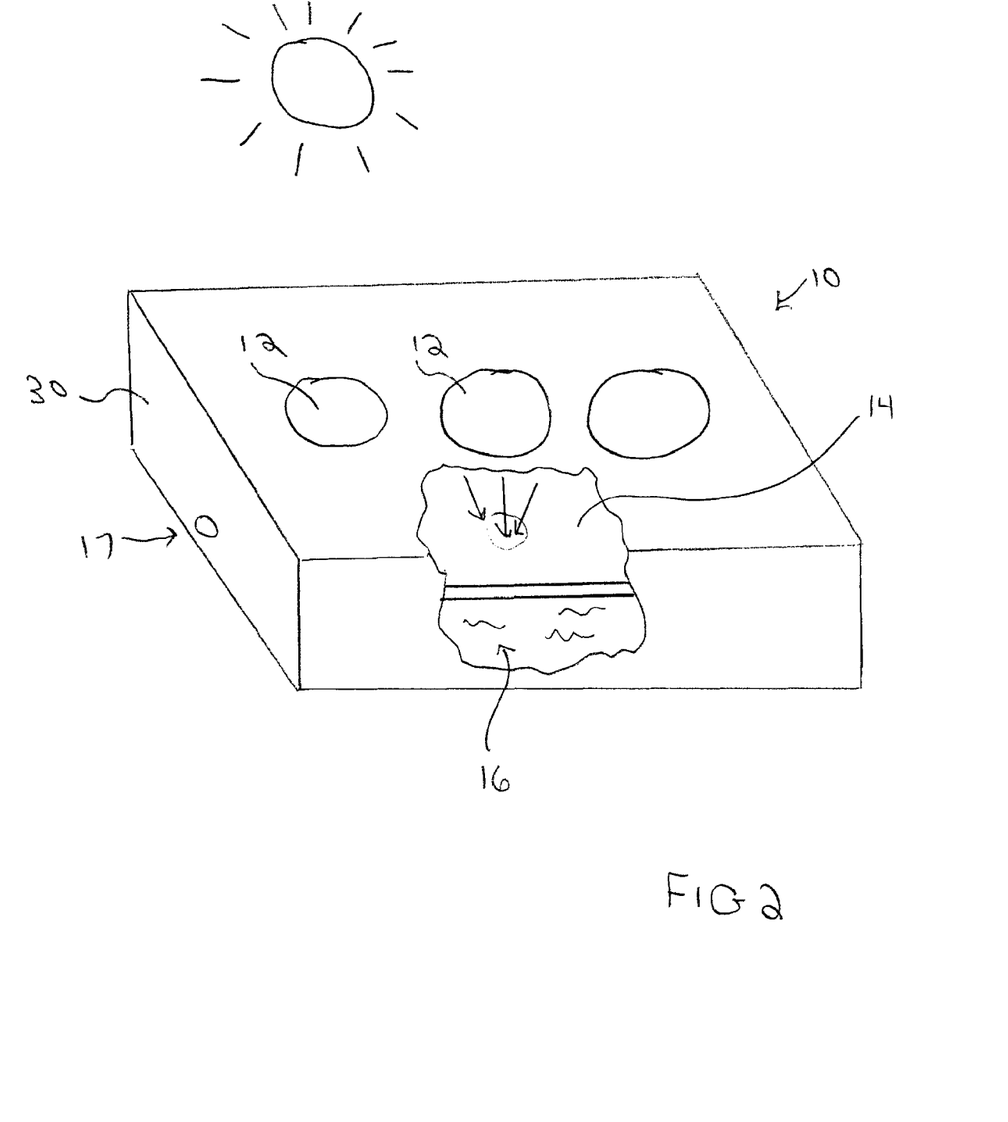
FIG. 2 is a top cut away perspective view of the present solar collector.
Figure 3:
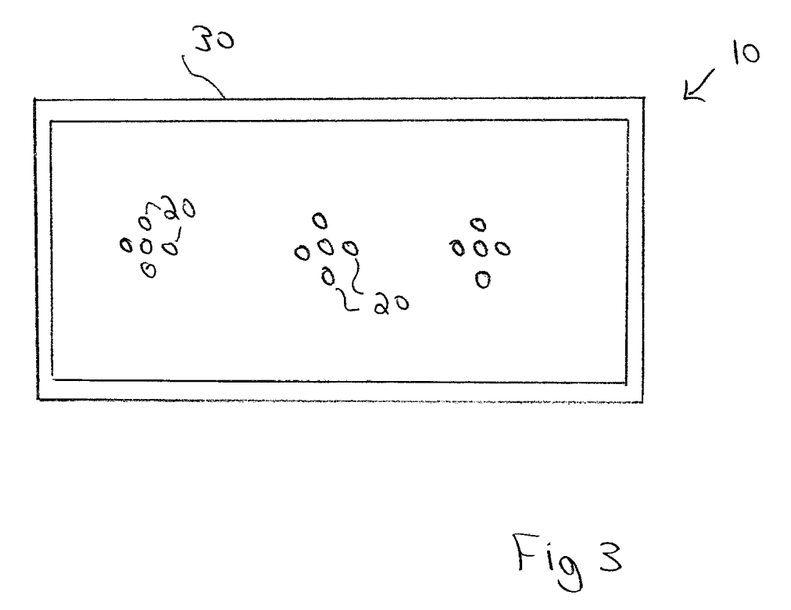
FIG. 3 is a bottom plan view along line 3-3 in FIG. 1.
Figure 5:
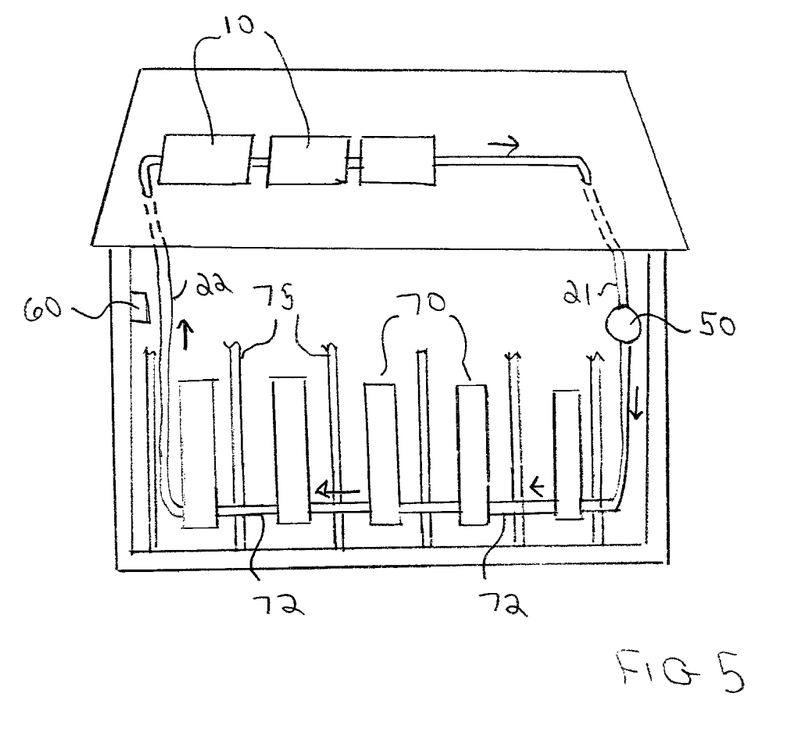
FIG. 5 is a schematic of a number of the present collectors mounted on top of a house, and connected to fluid reservoirs disposed within the walls of the house.
Figure 6:
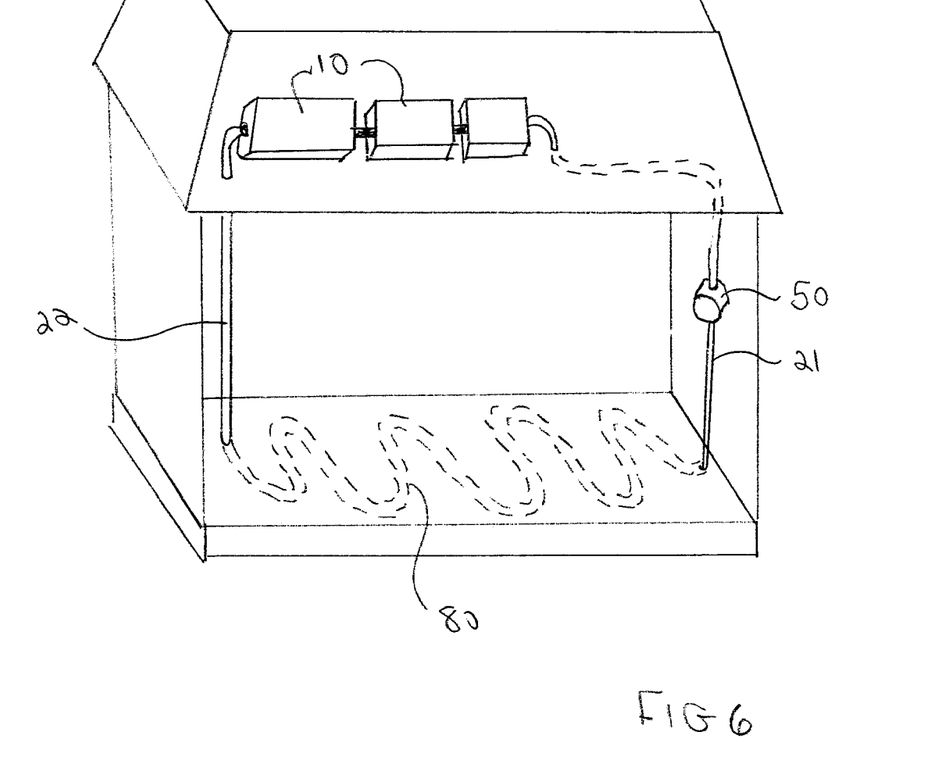
FIG. 6 is a schematic of a number of the present collectors mounted on top of a house, and connected to tubing in the floor of the house.
Figure 7:
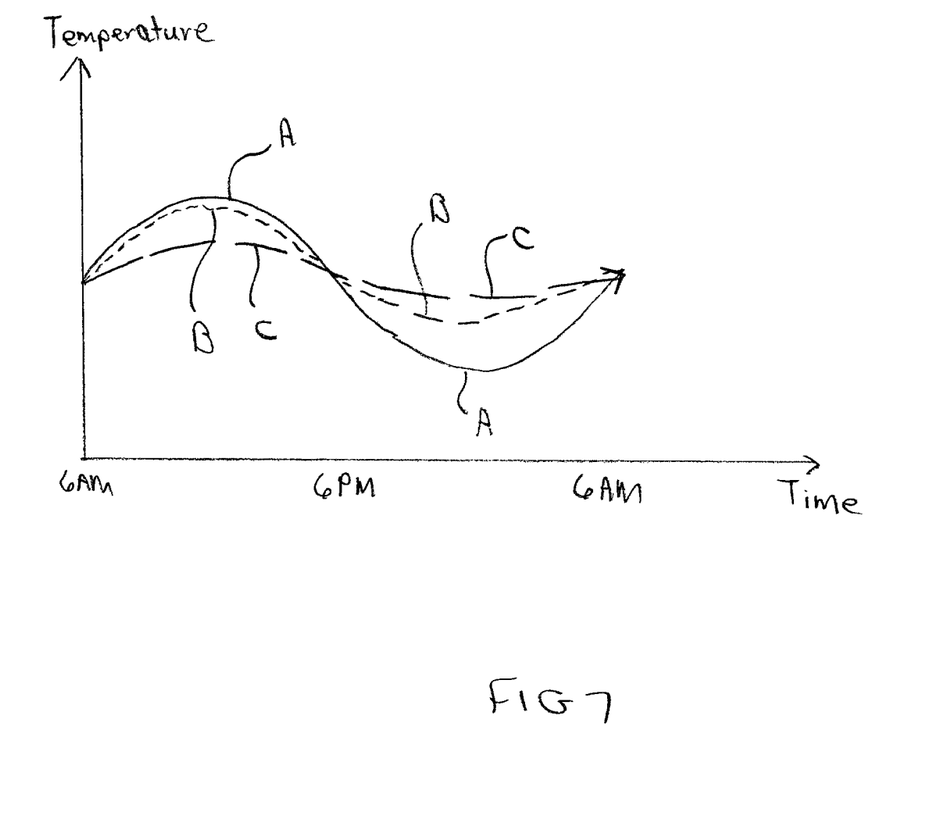
FIG. 7 is a time vs. temperature plot showing the beneficial effects of a time-delay heat absorption and heat loss system.

FIGS. 1 to 3 illustrate the present solar water heating collector. FIGS. 4A to 6 illustrate various installations of the solar water heating collector system in a home, and FIG. 7 illustrates the beneficial effects of the present system when used as a time-delay heat absorption and heat loss system for keeping the building warm during the night.

Referring first to FIGS. 1 to 3, the present invention provides a solar heating collector 10 for heating a fluid (preferably water). Collector 10 comprises: an array of convex lenses 12 and a panel 14 disposed below the array of convex lenses. The array of convex lenses 12 focus sunlight on panel 14 to heat specific areas of the panel. It is to be understood that the "array" of convex lenses 12 described herein may comprise any number of convex lenses disposed in any particular pattern on the top of collector 10. Collector 10 also includes a fluid chamber 16 disposed below the panel, the fluid chamber having a fluid inlet 17 and a fluid outlet 19.

As can also be seen, a plurality of members 20 extend from the bottom of panel 14 into fluid chamber 16. Members 20 transfer heat from panel 14 into the fluid in fluid chamber 16 below. As seen clearly in FIGS. 1 and 3, members 20 may preferably be clustered on the areas of the panel 14 opposite to which the sunlight is focused. As a result, members 20 will preferably extend downwardly into the fluid from the hottest regions of panel 14. In preferred aspects, panel 14 is made of a suitable heat-conducting metal.

As can also be seen, the array of convex lenses 12 is separated from panel 14 by an air gap 11. In one preferred embodiment, air gap 11 is sealed to external air. In this embodiment, the air in gap 11 will heat up and can be used as a hot air source. However, in another preferred embodiment, air gap 11 is open to external air. This embodiment would prevent overheating of collector 10 as it sits on the roof.

Together, convex lens array 12, panel 14, fluid chamber 16, members 20 and air gap 11 are all disposed within housing 30. Housing 30 is preferably designed to be mounted onto the roof of a building (as seen in FIGS. 4 to 6).

Figure 4A:
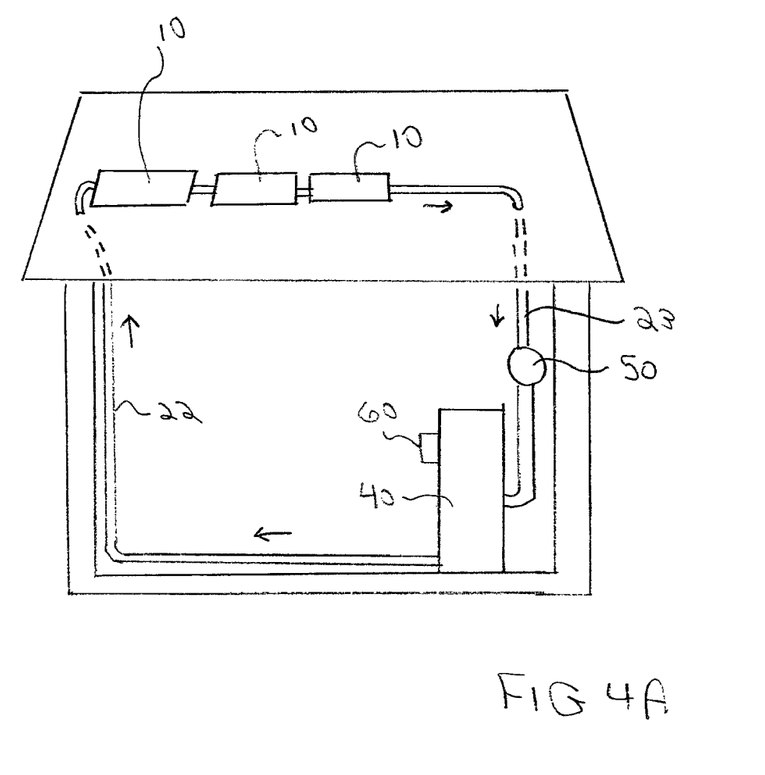
FIG. 4A is a schematic of a number of the present collectors mounted on top of a house, and connected together in series to a hot water heater.
Figure 4B:
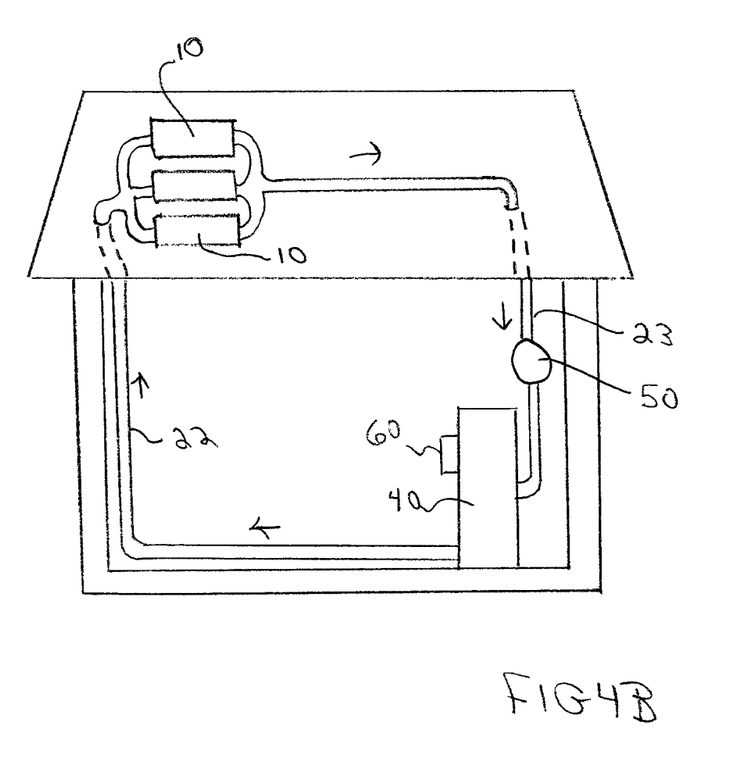
FIG. 4B is a schematic of a number of the present collectors mounted on top of a house, and connected together in parallel to a hot water heater.

Turning first to FIG. 4A, a plurality of solar collectors 10 are mounted onto the roof of a house. As can be seen, these collectors 10 are connected in series (with the fluid output from one being the fluid input to another). Arrows show the direction of fluid flow passing through collectors 10, into hot water heater tank 40 and then returning. Fluid flow through the system is activated by turning on pump 50. When pump 50 is turned on, heated water obtained from collectors 30 is transported into hot water heater tank 40 for use by the building's occupants. Specifically, fluid inlet line 22 moves cooler water from hot water heater 40 into fluid chamber 16 of collector 10, and fluid outlet line 23 moves heated water from fluid chamber 16 of collector 10 back into hot water heater 40.

In one aspect, water can either be continually recirculated through the system in a continuous loop. As such, the water can be continuously cycled through the system to keep the water in tank 40 as warm as possible. It is to be understood that the present system can thus be used as the sole heating source tank 40. However, it can also be used to supplement an existing gas or electric heating source for hot water tank 40. It is also to be understood that as the building occupants use the hot water in tank 40, the water can be replenished through a standard plumbing connection (not shown).

The control of pump 50 can be in response to a temperature control 60 that measures the water temperature in hot water in tank 40. Should the water temperature in tank 40 cool below a pre-set temperature, pump 50 can then automatically be turned on by temperature control 60 such that solar collectors 10 begin to warm the water circulating therethrough. Optionally, temperature control 60 could also be used to turn on additional (i.e.: backup) heating sources to warm the water in tank 40 using gas or electric power.

FIG. 4B is similar to FIG. 4A, but the three solar collectors 10 are instead mounted in parallel to one another.

Turning next to FIG. 5, a system for using collectors 10 to warm the air in a building is provided. In this aspect, a plurality of water containers 70 are positioned within the walls of the building. For example, individual water containers 70 may each be positioned between vertical building studs 75, and be connected together by tubing 72. When pump 50 is turned on, water is recirculated through the system (in the direction of the arrows) such that solar collectors 10 begin to warm the water. In one aspect, having warm water stored in the walls of the building can in turn cause the air temperature in the building to rise. In addition, however, storing warmed water in the walls of the building can also simply help keep the building warm through the cool night. It is to be understood that the present invention is not limited to having water containers 70 positioned between building studs. Rather, other tank locations in the building could also be used. Different numbers of tanks or containers can be used. Moreover, these warm water containers 70 can be used to supplement other building heating systems.

Optionally, the control of pump 50 can be in response to a temperature control 60 that measures the air temperature within the building. Should the air temperature in the building cool below a pre-set temperature, then pump 50 can automatically be turned on by temperature control (e.g.: thermostat) 60 such that solar collectors 10 begin to warm the water circulating therethrough. Optionally, thermostat 60 could also be used to turn on additional (i.e.: backup) heating sources to warm the building using gas or electric power. Preferably, as is common with thermostats, the control system will turn the pump on below a first pre-set temperature and off above a second pre-set temperature.

Turning next to FIG. 6, another system similar to FIG. 5 is presented. In FIG. 6, the fluid reservoir instead comprises tubing 80 disposed within the floor of the building. Collectors 10 warm water as explained above, and the heated water is passed through tubing 80 to instead warm the floor of the building. It is to be understood that the embodiment shown in FIG. 6 can be used together with either of the embodiments shown in FIG. 4 or 5.

As illustrated above, the present system can be used on a house. However, it can also be used on any other suitable building or structure to collect heated water.

Lastly, FIG. 7 illustrates the beneficial effects of a time delay in building cooling. A standard house (not using water containers 70) is represented by curve "A". The house will tend to heat to its warmest temperature in the middle of the day, and cool to its coldest temperature in the middle of the night. The present heated water containers 70 can shift the heating pattern to that seen in curve "B". Specifically, in cold weather climates or seasons, the building can be heated during the day by water collectors 10, but will be slower to cool at night (since the water in containers 70 will lose heat slower than the air in the building).

In addition, during hot weather, the system can be turned off entirely with pump 50 stopped. During this time, water will simply sit in containers 70. This water will tend to keep the building cool during the day (being slow to warm), yet also keep the building warm during the night (being slow to cool). Thus, a temperature profile as represented by line "C" can be achieved.

What is claimed:

1. A solar heating collector with a housing, wherein the housing comprises:
   (i) an array of lenses;
   (ii) a panel with an under side and an upper side, wherein the panel is disposed below the array of lenses, wherein the array of lenses focuses sunlight on the panel to heat pre-determined areas of the panel, and wherein the array of lenses are spaced apart from the panel by an air gap;
   (iii) a fluid chamber disposed below the panel, wherein fluids enter the fluid chamber through a fluid inlet, collect therein, and exit the fluid chamber through a fluid outlet; and
   (iv) a plurality of members, each member comprising a proximal end in communication with the under side of the panel and a distal end that terminates in the collected fluids in the fluid chamber, wherein each member extends from the panel into the fluid chamber to transfer heat from the pre-determined areas of the panel into the collected fluids in the fluid chamber,
   wherein each of the lenses in the array of lenses heats an associated pre-determined area of the panel by focusing sunlight on the panel adjacent to a location from which one or more of the plurality of members extends; and
   wherein heat generated by sunlight focused on the pre-determined areas of the panel is also dissipated from the underside of the panel to collected fluids in the fluid chamber.

2. The solar heating collector of claim 1, wherein the housing can be mounted on a roof of a building.

3. The solar heating collector of claim 1, wherein the panel is made of metal.

4. The solar heating collector of claim 1, wherein the fluid in the fluid chamber is water.

5. The solar heating collector of claim 1, wherein the plurality of members extending from the panel are clustered around areas on the panel onto which sunlight is focused.

6. The solar heating collector of claim 1, wherein the air gap is sealed so that air in the air gap heats up to form a second source of heat to be transferred to the fluids through the panel and associated members.

7. The solar heating collector of claim 1, wherein the air gap is open.

8. A solar water heating system, comprising:
   (a) a solar heating collector with a housing, wherein the housing comprises:

(i) an array of lenses;
(ii) a panel with an under side and an upper side, wherein the panel is disposed below the array of lenses, wherein the array of lenses focuses sunlight on the panel to heat pre-determined areas of the panel, and wherein the array of lenses are spaced apart from the panel by an air gap,
(iii) a fluid chamber disposed below the panel, wherein fluids enter the fluid chamber through a fluid inlet, collect therein, and exit the fluid chamber through a fluid outlet, and
(iv) a plurality of members, each member comprising a proximal end in communication with the under side of the panel and a distal end that terminates in the collected fluids in the fluid chamber, wherein each member extends from the panel into the fluid chamber to transfer heat from the pre-determined areas of the panel into the collected fluids in the fluid chamber;
wherein each of the lenses in the array of lenses heats an associated pre-determined area of the panel by focusing sunlight on the panel adjacent to a location from which one or more of the plurality of members extends; and
wherein heat generated by sunlight focused on the pre-determined areas of the panel is also dissipated from the underside of the panel to collected fluids in the fluid chamber;
(b) a fluid reservoir;
(c) a fluid inlet line for moving fluid from the fluid reservoir into the fluid inlet of the fluid chamber of the solar heating collector;
(d) fluid outlet line for moving fluid from the fluid outlet of the fluid chamber of the solar heating collector to the fluid reservoir; and
(e) a pump for moving fluid cyclically through the fluid chamber of the solar collector and the fluid reservoir.

9. The system of claim 8, wherein the fluid reservoir comprises a hot water heater.

10. The system of claim 8, wherein the fluid reservoir comprises a plurality of water containers disposed within the walls of a building.

11. The system of claim 8, wherein the fluid reservoir comprises tubing disposed within the floor of a building.

12. The system of claim 8, wherein the solar heating collector is mounted onto a roof of a building and the fluid reservoir is disposed within the building.

13. The system of claim 12, wherein the building is a house.

14. The system of claim 8, further comprising a control system for turning the pump on and off.

15. The system of claim 14, wherein the control system comprises a thermostat that turns the pump on below a first pre-set temperature and off above a second pre-set temperature.

16. The system of claim 15, wherein the first and second pre-set temperatures are temperatures of fluid in the fluid reservoir.

17. The system of claim 15, wherein the first and second pre-set temperatures are temperatures of air in a building.

* * * * *